(12) United States Patent
Dust et al.

(10) Patent No.: US 12,082,324 B2
(45) Date of Patent: Sep. 3, 2024

(54) METHOD AND SYSTEM FOR REGULATING THE BRIGHTNESS OF INTERIOR LIGHTING MEANS

(71) Applicant: STEINEL GmbH, Herzebrock-Clarholz (DE)

(72) Inventors: Christian Dust, Herzebrock-Clarholz (DE); Torsten Born, Oerlinghausen (DE)

(73) Assignee: STEINEL GmbH, Herzebrock-Clarholz (DE)

( * ) Notice: Subject to any disclaimer, the term of this patent is extended or adjusted under 35 U.S.C. 154(b) by 146 days.

(21) Appl. No.: 17/917,148

(22) PCT Filed: Mar. 23, 2021

(86) PCT No.: PCT/EP2021/057472
§ 371 (c)(1),
(2) Date: Oct. 5, 2022

(87) PCT Pub. No.: WO2021/204538
PCT Pub. Date: Oct. 14, 2021

(65) Prior Publication Data
US 2023/0031277 A1    Feb. 2, 2023

(30) Foreign Application Priority Data
Apr. 6, 2020 (DE) .......................... 102020109523.6

(51) Int. Cl.
*H05B 47/00* (2020.01)
*H05B 47/11* (2020.01)
(Continued)

(52) U.S. Cl.
CPC ........... *H05B 47/11* (2020.01); *H05B 47/115* (2020.01); *H05B 47/155* (2020.01); *H05B 47/175* (2020.01)

(58) Field of Classification Search
CPC .... H05B 47/11; H05B 47/115; H05B 47/175; H05B 47/155; H05B 47/16
See application file for complete search history.

(56) References Cited

U.S. PATENT DOCUMENTS

2015/0002029 A1* 1/2015 Ide .......................... H05B 45/12
                                                                315/149
2017/0038787 A1* 2/2017 Baker .................. H04B 17/318
(Continued)

FOREIGN PATENT DOCUMENTS

DE         102010003804 A1    10/2011

OTHER PUBLICATIONS

International Search Report dated Jul. 13, 2021 for corresponding application PCT/EP2021/057472.

*Primary Examiner* — Tuan T Lam
(74) *Attorney, Agent, or Firm* — Bachman & LaPointe, P.C.

(57) ABSTRACT

The invention relates to a method and a system for regulating the brightness of target zone lighting means that illuminate an interior target zone of an interior. The method comprises the following steps: optically mapping at least part of the interior to an interior image by means of spatially resolved brightness sensor means; determining a present brightness value vector, the components $\alpha_i(t)$ of which correspond to present integrated brightness values of an i-th interior image zone; determining a target zone brightness control value from the scalar product of the present brightness value vector and a target zone calibration vector associated with an interior target zone; and regulating the target zone brightness control value to a target zone brightness setpoint value by adapting the illumination intensity of the target zone lighting means.

16 Claims, 2 Drawing Sheets

(51) Int. Cl.
*H05B 47/115* (2020.01)
*H05B 47/155* (2020.01)
*H05B 47/175* (2020.01)

(56) References Cited

U.S. PATENT DOCUMENTS

2018/0063485 A1* 3/2018 Sannala ................ H04W 48/10
2018/0168020 A1* 6/2018 Casey .................. H05B 47/105
2024/0049375 A1* 2/2024 Baker .................... H05B 45/12

* cited by examiner

METHOD AND SYSTEM FOR REGULATING THE BRIGHTNESS OF INTERIOR LIGHTING MEANS

BACKGROUND OF THE INVENTION

The invention relates to a method for regulating the brightness of interior lighting means. Furthermore, the invention relates to a system for carrying out such a method. In particular, the invention relates to a daylight-dependent light control system with camera sensor technology.

A defined lighting level (usually 500 lx) must be ensured at office workstations. At the same time, offices usually also have windows, so that the incident daylight contributes to the illumination and thus energy can be saved. However, to date there is no efficient way to accurately measure the amount of light incident on a workstation.

Methods for regulating the brightness of interior lighting means are known from the prior art, in which light sensors, for example, phototransistors, are used which have a forward current modulated by the incident amount of light. This requires calibration with a luxmeter, usually at night, to be able to measure the contribution of artificial light to the overall brightness unaffected by daylight. Furthermore, it is necessary to install an independent sensor for each individual regulation range in the interior space.

US 2018/0168020 A1 describes a visible light sensor that can be configured to detect environmental features of a room based on an image of the room. The visible light sensor can be controlled in one or more modes, including a daylight glare sensor mode, a daylight sensor mode, a color sensor mode, and/or an occupancy/vacancy sensor mode. In the daylight glare sensor mode, the visible light sensor can be configured to reduce or eliminate the glare effect in a room. In the daylight sensor mode and color sensor mode, the visible light sensor can be configured to provide a preferred amount of light or color temperature in the room. In the occupancy/vacancy sensor mode, the visible light sensor can be configured to detect an occupancy/vacancy state in the room and adjust one or more control devices according to the occupancy or vacancy of the room. The visible light sensor can be configured to protect the privacy of users within the room via software, a removable module, and/or a dedicated sensor.

With such known methods, the regulation becomes increasingly inaccurate as the daylight component increases. One reason for this, amongst others, is that the light sensor (which can also be a camera sensor) perceives more and more reflected brightness or an infrared light component as the daylight brightness increases. As a result, the brightness value measured by the sensor is usually greater than the actual brightness value determined on a target surface with a luxmeter.

This brighter perception by the light sensor causes the illumination regulation system to regulate down too far, and the brightness set value on the target surface is not achieved. This behavior is corrected in the prior art by additional offsets, which causes the amount of light to be too high for most of the day, wasting energy.

Furthermore, it is very difficult to accurately measure the amount of light incident on a workstation with a single sensor. Light sensors usually operate diffusely, so they provide only the average value of illumination in the room. Focused sensors and sensors directly on the desk have also been used. However, both are highly dependent on the environment (laptops, bags, jackets, people) and especially the latter are at risk, for example, from vandalism.

SUMMARY OF THE INVENTION

Accordingly, the invention is based on the object of providing a method and a system which enable regulation of the brightness of interior lighting means as precisely as possible to a target value.

This object is achieved by the method as disclosed herein and also the system as disclosed herein. Advantageous embodiments and further embodiments of the invention are disclosed herein and given in the sub-claims.

In accordance with the invention, a method is provided for regulating the brightness of target zone lighting means illuminating an interior target zone in an interior space. The method includes the following steps: optically mapping at least part of the interior space onto an image of the interior space by spatially resolved brightness sensor means; determining a current brightness value vector the components $\alpha_i(t)$ of which correspond to current integrated brightness values of an $i^{th}$ interior image zone; determining a target zone brightness regulation value from the scalar product of the current brightness value vector and a target zone calibration vector associated with an interior target zone; and regulating the target zone brightness regulation value to a target zone brightness set value by adjusting the illumination intensity of the target zone lighting means. This allows the regulation value for regulating the brightness of target zone lighting means to be determined very precisely. Furthermore, this makes it possible to regulate multiple lighting means independently of each other, with only one sensor being required for this. As a result, energy can be saved significantly.

Thus, in accordance with the invention, a method for regulating the brightness of target zone lighting means is provided, in which the camera image of a camera-based sensor is divided into several zones, which are used—differently weighted—for calibration, light measurement and regulation. The image taken by the camera is analyzed in terms of image brightness. This is done individually for each zone configured in the sensor. The sensor is thus capable of outputting brightness values that have a linear dependence on the actual brightness in the zone. To achieve accurate regulation of light, the zone brightness values must be calibrated. A special feature of the calibration is that all target measurement zones are calibrated in conjunction with a zone that records only incident daylight.

The brightness sensor means can include a photodiode array or a camera. A necessary spatial resolution can be achieved thereby.

The interior space can include a building's interior space and the interior image zones correspond to different space areas of the building's interior space the reflective properties of which remain substantially unchanged. This avoids reflection-related disturbances or fluctuations in the values of the brightness value vector. Consequently, an accurate determination of the target zone brightness regulation value can be made.

The components $\lambda_i$ of the target zone calibration vector can be determined by solving the linear system of equations $$\Sigma_i \alpha_{ji} \lambda_i = K_j$$

wherein index i corresponds to the $i^{th}$ interior image zone, $\alpha_{ij}$ corresponds to the integrated brightness value of the $i^{th}$ interior image zone at different times of the day or in different lighting situations j, and $K_j$ corresponds to the brightness values in the interior target zone measured by a luxmeter at the time of day or in the lighting situation j. This allows accurate calibration of the brightness value vector so that a target zone brightness regulation value suitable for accurately regulating the target zone illumination intensity can be determined from the values of the brightness value vector and the target zone calibration vector.

When determining the target zone calibration vector, it is advantageous if the brightness value $K_j$ measured by the luxmeter is a value integrated only over the visible spectral range, wherein the brightness value of the $i^{th}$ interior image zone determined by the brightness sensor means is a value integrated over both the visible spectral range and a non-visible spectral range. This prevents the target zone brightness in the visible spectral range from being regulated down in the case of a very strong daylight component with a high infrared component (in contrast to an artificial lighting source with a low infrared component), since the infrared component is erroneously included for determining the brightness in the visible spectral range. Spectral distortions of the brightness values measured by the brightness sensor means can therefore be avoided.

An interior image zone can correspond to a window area. This allows the contribution of daylight to the brightness in the interior space to be determined.

The component of the target zone calibration vector that corresponds to the interior image zone corresponding to a window area can be negative. This allows the influence of daylight to be eliminated when calibrating the brightness value vector.

The method can further include a presence detection step of detecting a presence of people in the interior image zones, wherein interior image zones in which the presence of people has been detected are not used to determine the components of the current brightness value vector. In this way, a falsification of the values of the brightness value vector caused by a presence of people can be avoided.

The interior image zones used to determine the components of the brightness value vector can correspond to substantially invariable areas, in particular, wall and/or ceiling areas of the interior space. This makes it possible to avoid disturbances or fluctuations in the values of the brightness value vector to enable the most accurate determination of the target zone brightness regulation value.

In accordance with the invention, there is further provided a system for regulating the brightness of target zone lighting means illuminating an interior target zone in an interior space. The system includes spatially resolved brightness sensor means which are configured to optically map at least part of the interior space onto an image of the interior space and to determine a current brightness value vector, the components $\alpha_i(t)$ of which correspond to current integrated brightness values of an $i^{th}$ interior space zone. The system can further include a computing unit which is configured to determine a target zone brightness regulation value from the scalar product of the current brightness value vector and a target zone calibration vector associated with an interior target zone. Furthermore, the system can include a regulation unit which is configured to regulate the target zone brightness regulation value to a target zone brightness set value by adjusting the illumination intensity of the target zone lighting means. The provision of such a system makes it possible to determine the regulation value for regulating the brightness of target zone lighting means very precisely. It becomes possible to regulate multiple lighting means independently, with only one sensor being required for this. As a result, energy can be saved significantly.

The system can further include presence detection means which are configured to detect a presence of people in the interior image zones. In this way, falsification of the brightness values caused by a presence of people can be avoided.

The regulation unit can include an IP interface and/or a system bus interface. For example, the regulation unit can be BACnet and/or DALI compatible. This enables control of target zone lighting means in accordance with the standard network protocols for building automation.

The system can further include a luxmeter which is configured to measure brightness values in an interior target zone to calibrate the device prior to commencement of the regulation operation. This allows accurate calibration of the brightness values so that a target zone brightness regulation value suitable for accurately regulating the target zone illumination intensity can be determined.

The regulation unit can be configured to perform a regulation operation at time intervals of less than one second or less than two seconds by adjusting the illumination intensity of the target zone lighting means.

In this process, the time interval between two successive regulation operations can be smaller when the illumination intensity is increased than when the illumination intensity is decreased. As a result, the change in brightness of the lighting means due to the brightness regulation operations can be less noticeable for a user located in the target zone. In this way, any disturbing sensations caused by the regulation of brightness can be avoided or minimized for the user.

BRIEF DESCRIPTION OF THE DRAWINGS

The invention will be explained in more detail in the following text, for example, based on the drawings in which.

In the various figures in the drawings, components corresponding to one another are provided with identical reference numerals.

DETAILED DESCRIPTION

Figure 1:
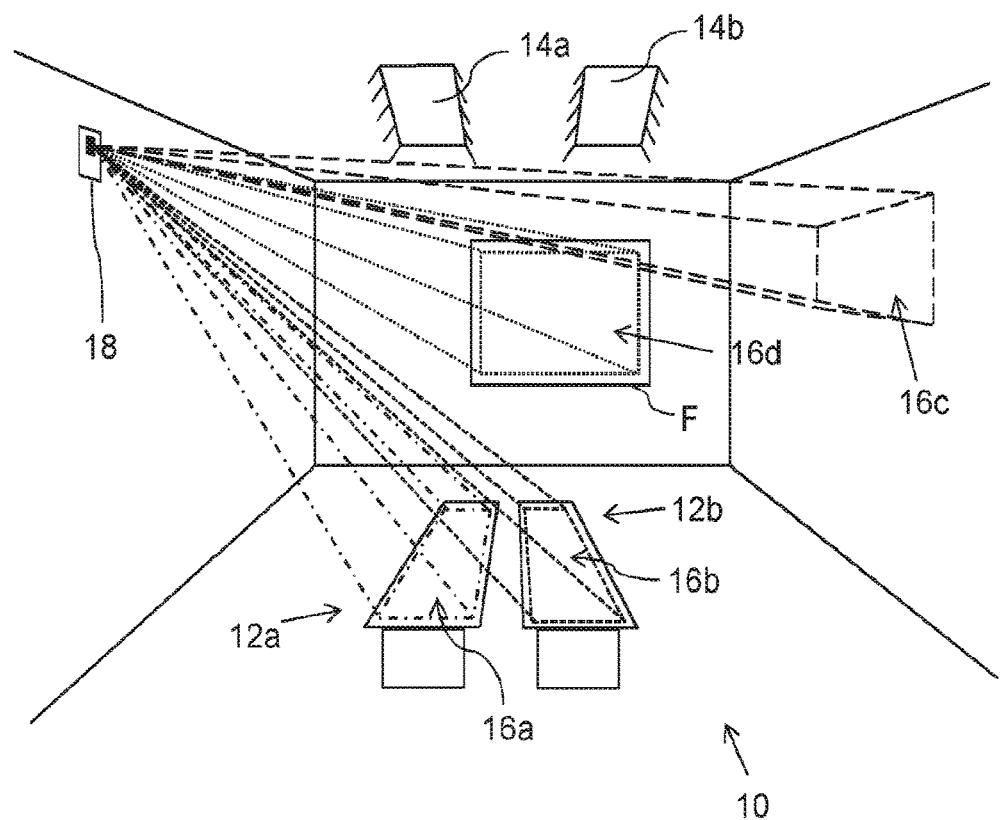
FIG. 1 shows a schematic sectional view of an interior space.

FIG. 1 shows a schematic sectional view of an interior space 10. The interior space 10 can be a building's interior space 10, such as an office interior space 10, and can include multiple workstations 12a, 12b. The interior space 10 can include multiple target zone lighting means 14a, 14b which are configured to illuminate the workstations 12a, 12b. In the illustrated exemplary embodiment, the target zone lighting means 14a and 14b, respectively, are associated with the workstations 12a and 12b, respectively, so that the target zone lighting means 14a and 14b, respectively, illuminate an associated target zone 16a or 16b at the associated workstation 12a or 12b. In this case, it is convenient if a target zone lighting means 14a or 14b associated with a workstation 12a or 12b illuminates the corresponding workstation 12a or 12b in a focused manner so that sufficient separation is created when regulating the target zone lighting means 14a and 14b, respectively. However, multiple target zone lighting means can be associated with a target zone and/or a target zone lighting means can be associated with multiple target zones. For example, the target zones 16a, 16b can each include a surface of a desk 12a, 12b and/or a PC workstation or a work surface of a workshop workstation. The interior space 10 can further include at least one wall with a wall zone 16c and at least one window F with a window zone 16d, with daylight entering the interior space 10 through the window F.

As can be seen from FIG. 1, the interior space 10 further includes spatially resolved brightness sensor means 18 which are configured to optically map at least part of the interior space onto an image 20 of the interior space. In the illustrated exemplary embodiment, the brightness sensor means 18 include a video camera 18. However, the brightness sensor means 18 can also include a photodiode array or any other type of spatially resolved brightness sensor means.

Figure 2:
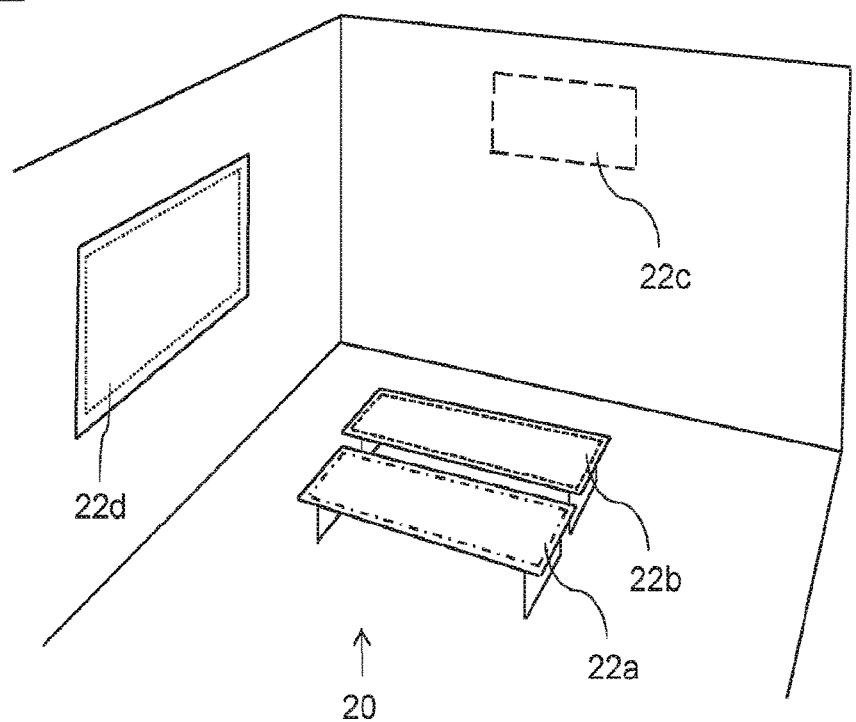
FIG. 2 shows a schematic view of an image of the interior space created by spatially resolved brightness sensor means.

FIG. 2 shows a schematic view of an image 20 of the interior space created by spatially resolved brightness sensor means 18. As can be seen from FIG. 1, the image 20 of the interior space includes multiple interior image zones 22a, 22b, 22c, 22d. The brightness sensor means 18 can be configured to determine a current brightness value vector the components $\alpha_i(t)$ of which correspond to current integrated brightness values of an $i^{th}$ interior image zone, with the index i running over at least one subset of the set of interior image zones 22a, 22b, 22c, 22d.

Figure 3:
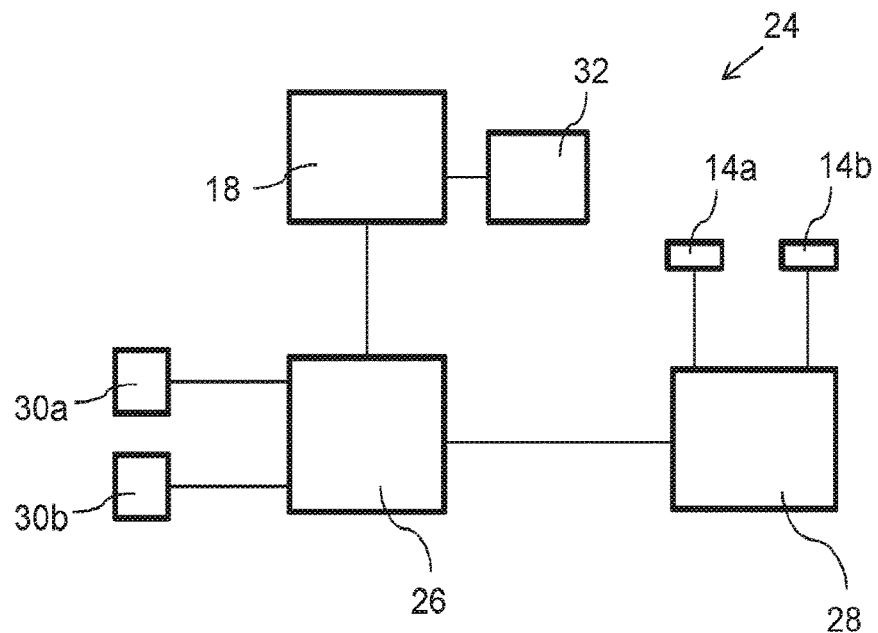
FIG. 3 shows a schematic view of a system for regulating brightness according to an exemplary embodiment of the invention.

FIG. 3 shows a schematic view of a system 24 for regulating brightness according to an exemplary embodiment of the invention. In addition to spatially resolved brightness sensor means 18, the system 24 includes a computing unit 26 which is configured to compute a target zone brightness regulation value from the scalar product of the current brightness value vector $\alpha_i(t)$ and a target zone calibration vector, wherein the target zone calibration vector is associated with an interior target zone 16a, 16b. The system 24 further includes a regulation unit 28 which is configured to regulate the target zone brightness regulation value to a target zone brightness set value by adjusting the illumination intensity of the target zone lighting means 14a, 14b.

Furthermore, the system 24 can include at least one luxmeter 30a, 30b which is configured to measure brightness values in an interior target zone 16a, 16b to calibrate the device prior to commencement of the regulation operation. The components $\lambda_i$ of the target zone calibration vector can be determined by solving the linear system of equations $$\Sigma_i \alpha_{ij} \lambda_i = K_j \quad (1),$$

wherein index i corresponds to the $i^{th}$ interior image zone, $\alpha_{ij}$ corresponds to the integrated brightness value of the $i^{th}$ interior image zone 22a, 22b, 22c, 22d at different times of the day or in different lighting situations j, and $K_j$ corresponds to the brightness values in the interior target zone 16a, 16b measured by the luxmeter 30a, 30b at the time of day or in the lighting situation j. In this process, the illumination intensity of the target zone lighting means 14a, 14b is always kept the same during the measurements at different times of the day or in different lighting situations j.

Although it is preferred to perform a calibration for at least two interior image zones 22a, 22d at different times of the day or in different lighting situations j, it is also possible and preferred to perform calibration for only one interior image zone, for example, for the entire interior space. For this purpose, calibration can be carried out in daylight on one hand and on one occasion on the other hand. With today's systems, an electrician must calibrate once during the day and, at worst, again at night. The target zone calibration vector $\lambda_i$, has, in this case, only one component $\lambda$, wherein $\lambda = K/\alpha$. Due to this advantageous scaling, a commercially available camera can be used as a luxmeter.

In a calibration for at least two interior image zones 22a, 22d, it is advantageous if at least one interior image zone 22d maps at least one partial area of the window zone or window area 16d, while the other interior image zones 22a, 22b, 22c map interior areas. This is the best way to compensate for a daylight component.

The luxmeter can be sensitive only in the visible spectral range, and the brightness sensor means can be sensitive in both the visible spectral range and the non-visible or infrared range. This allows spectral distortions of the brightness values measured by the brightness sensor means to be avoided. When determining the target zone calibration vector and the current brightness values, a luxmeter is sensitive only in the range visible (to the human eye), but a brightness sensor means is usually also sensitive in the infrared range. Since daylight contains a significant infrared component, a sensor sensitive to this range will always measure different light values than a luxmeter.

Thus, when determining the target zone calibration vector, the brightness value $K_j$ measured by the luxmeter can be a value integrated only over the visible spectral range or over a spectral subrange of the visible spectral range, whereas the brightness value of the $i^{th}$ interior image zone $\alpha_{ij}$ determined by the brightness sensor means is a value integrated both over the visible spectral range or over a spectral subrange of the visible spectral range and over a non-visible spectral range or over a spectral subrange of the non-visible spectral range.

A visible spectral range is to be understood as a spectral range of electromagnetic waves that lies in a wavelength range from 380 nm to 780 nm, since the human eye detects electromagnetic vibrations as visible light radiation in the spectral range from 380 to 780 nm. A person perceives wavelengths around 555 nm, the light of the color green, as the brightest. A person is much less sensitive to the colors violet and blue in the range from 380 to 480 nm or the colors yellow, orange and red in the range from 560 to 780 nm. The map of this sensitivity curve is called the $V(\lambda)$ function. A spectral subrange of the visible spectral range may be understood as one or more continuous sections in the visible spectral range, one or more monochromatic points in the visible spectral range, or even an infinite spectral range filtered by a human sensitivity curve for brightness or the $V(\lambda)$ function and having a finite integral (similar to a Gaussian curve). The decisive factor in determining the brightness value $K_j$ by integration over the visible spectral range is that spectral components of the electromagnetic range that do not contribute to a person's perception of brightness are not included in the integrated value $K_j$, or are included to a negligible extent. In other words, a commercially available luxmeter can be used.

In principle, a non-visible spectral range is to be understood as a spectral range of electromagnetic waves that lies outside a wavelength range from 380 nm to 780 nm. A spectral subrange of the non-visible spectral range may be understood as one or more continuous sections in the non-visible spectral range, one or more monochromatic points in the non-visible spectral range, or even an infinite spectral range filtered by a sensitivity curve of a camera or a common semiconductor photosensor and having a finite integral (similar to a Gaussian curve). Decisive for the determination of the brightness value $\alpha_{ij}$ by integration over the visible and non-visible spectral range is that spectral components of the electromagnetic range, which do not contribute to a person's perception of brightness, are included in the integrated value $\alpha_{ij}$ to a non-negligible extent. In other words, a commercially available camera or CMOS sensor can be used without additional filters, since the target zone calibration vector according to the invention compensates for an excessively high proportion of non-visible light, for example, infrared or UV.

By means of the regulation of brightness according to the invention with the aid of a target zone calibration vector, it is therefore possible to prevent the target zone brightness in the visible spectral range from being regulated down in the case of a very strong daylight component with a high infrared component or a very high UV component (in contrast to an artificial lighting source with a low infrared component), since the infrared component or UV component is erroneously included for determining the brightness in the visible spectral range.

In the illustrated exemplary embodiment, the luxmeters 30a and 30b are associated with the respective interior target zones 16a and 16b and are placed, for example, on the work surface of the respective workstation 12a or 12b during the calibration process. As can be seen from FIG. 2, the interior image zone 22d includes at least one portion of the window zone 16d. To determine the target zone calibration vector $\lambda_i^a$ for the target zone 16a associated with the workstation 12a according to Equation (1), another interior image zone is selected for the measurement of the components of the brightness value vector in addition to the interior image zone 22d, for example, the interior image zone 22a which directly maps the workstation 12a. However, another interior image zone, for example, the interior image zone 22c, which corresponds to space areas of the interior space 10 the reflective properties of which remain substantially unchanged, may also be selected. These can be substantially invariable areas, in particular, wall and/or ceiling areas of the interior space 10. In the illustrated exemplary embodiment, the interior image zone 22c corresponds to the wall zone 16c. This avoids especially reflection-related disturbances or fluctuations in the values of the brightness value vector. Consequently, an accurate determination of the target zone brightness regulation value can be made.

Thus, a two-component brightness value vector ($\alpha_1$, $\alpha_2$) is obtained, where the first component corresponds to the interior image zone 22d mapping the window F. In order to establish a system of equations according to (1), two different times of day or lighting situations j (j=1, 2) are selected, at which the values $K_j$ are measured by the luxmeter 30a. In this process, the illumination intensity of the target zone lighting means 14a, 14b is always kept the same during the measurements at different times of the day or in different lighting situations j. In this process, for example, the target zone lighting means 14a, 14b can always remain switched off. The two times of day or lighting situations are preferably selected in such a manner that they correspond to two very different daylight levels, for example, early morning when the sun is low in brightness and midday when the sun is full. Thus, the values $K_1$ and $K_2$ are obtained that are included in the system of equations $$\alpha_{11}\lambda_1^a + \alpha_{12}\lambda_2^a = K_1, \qquad (2)$$

$$\alpha_{21}\lambda_1^a + \alpha_{22}\lambda_2^a = K_2, \qquad (3),$$

where ($\alpha_{11}$, $\alpha_{12}$) and ($\alpha_{21}$, $\alpha_{22}$), respectively, are the brightness value vectors at the time of day or in lighting situation 1 or 2. By solving the system of equations (2), (3), the target zone calibration vector ($\lambda_1^a$, $\lambda_2^a$) is obtained for the target zone 16a. For example, the procedure described above can be performed analogously for target zone 16b to determine the corresponding target zone calibration vector ($\lambda_1^b$, $\lambda_2^b$).

Table 1, by way of example, gives experimental values for parameters $\alpha_{ij}$ and $K_j$.

TABLE 1

| Measurement | $\alpha_{j1}$ [Lux] | $\alpha_{j2}$ [Lux] | Kj [Lux] |
|---|---|---|---|
| Little daylight (j = 1) | 160 | 143 | 581 |
| Plenty of daylight (j = 2) | 217 | 415 | 687 |

By solving the system of equations (2), (3) with the $\alpha_{ij}$, and $K_j$ values from Table 1, the following is obtained for the target zone calibration vector: ($\lambda_1$, $\lambda_2$)=(−0.46, 4.04). The current target zone brightness regulation value h(t) is determined from the scalar product of the current brightness value vector ($\alpha_1(t)$, $\alpha_2(t)$) and the target zone calibration vector ($\lambda_1$, $\lambda_2$) as follows:

$$h(t) = -\alpha_1(t)*0.46 + \alpha_2(t)*4.04 \qquad (4).$$

As can be seen, the first component $\lambda_1$ corresponding to window F of the target zone calibration vector is negative. This takes into account the fact that in the method according to the invention, when determining the target zone brightness regulation value according to Equation (4), the influence of daylight on the current brightness value $\alpha_2(t)$ determined by brightness sensor means 18 is eliminated. Thus, taking into account the current daylight intensity, a target zone brightness regulation value can be determined which is very close to the value of the brightness actually prevailing in the target zone. As a result, the regulation can be very accurate and, as a consequence of this, energy can be saved significantly.

In the example illustrated above, the total number of interior image zones is 2, i.e., measurements had to be carried out at two different times of the day or in different illumination situations to obtain a clearly solvable linear system of equations (2), (3) for the 2-dimensional target zone calibration vector ($\lambda_1$, $\lambda_2$). In the general case of N interior image zones, measurements must be carried out at N different times of the day or in N different lighting situations j (j=1, . . . , N) to obtain a clearly solvable linear system of equations (1) with N equations for the N-dimensional target zone calibration vector $\lambda_i$, (i=1, . . . , N).

For precise calibration, it is advantageous if the artificial lighting is kept at the same illumination intensity during the two calibration measurements described above, since the calibration is intended to determine the influence of the natural light, and not the influence of the artificial light. Furthermore, in the exemplary embodiment described above, two measurements should be carried out in order to be able to solve the system of equations with two unknowns. The further apart the measuring points are in terms of brightness, the better. However, even a time interval of one hour (e.g., first measurement at 9:00 a.m. and second measurement at 10:00 a.m.) can provide a significant increase in daylight, thus allowing for accurate calibration. When calibrating only one target zone, it is convenient to use a second target zone containing a window area to achieve an accurate daylight calibration.

The system 24 can further include presence detection means 32 which are configured to detect a presence of people in the interior image zones 22a, 22b, 22c, 22d. In this case, the interior image zones in which a presence of people has been detected cannot be used to determine the components of the current brightness value vector. In this way, a falsification of the values of the brightness value vector caused by a presence of people can be avoided. Furthermore, the presence detection means 32 can be configured to detect an absence of people in the interior space 10. In this case, the regulation unit 28 can completely turn off the lighting in the interior space 10. This can save energy.

The regulation unit 28 can include an IP interface and/or another system bus interface. For example, the regulation unit 28 can be BACnet and/or DALI compatible. This enables control of target zone lighting means 14a, 14b that is compatible with standard network protocols for building automation.

The regulation unit 28 can be configured to perform a regulation operation at time intervals of less than one second or less than two seconds by adjusting the illumination intensity of the target zone lighting means 14a, 14b. This enables fast regulation of the illumination intensity. In this process, the time interval between two successive regulation operations can be smaller when the illumination intensity is increased than when the illumination intensity is decreased. Since, due to physiological reasons, the adaptation of the eye is faster when brightness is increased than when brightness is decreased, this may make the change in the brightness of lighting means by the brightness regulation operations less noticeable to a user located in the target zone. In this way, any disturbing sensations caused by the regulation of brightness can be avoided or minimized for the user.

Figure 4:
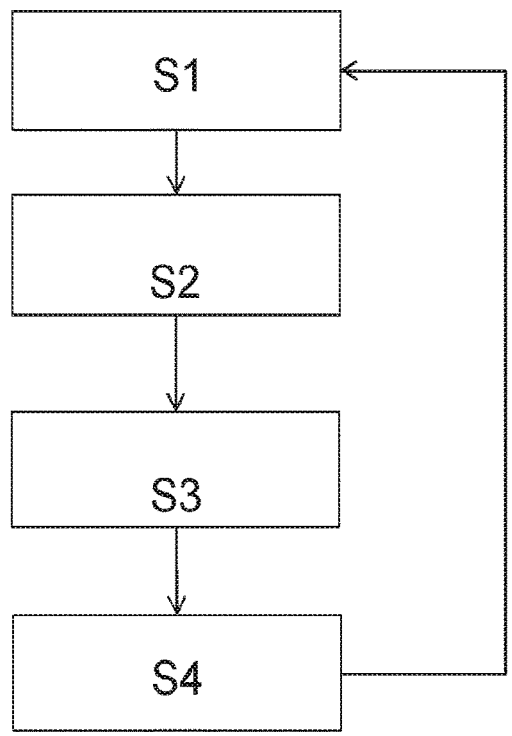
FIG. 4 shows a schematic flowchart of a method for regulating brightness.

FIG. 4 shows a schematic flowchart of a method for regulating brightness. The method comprises the following steps: optically mapping S1 at least part of the interior space onto an image of the interior space by spatially resolved brightness sensor means; determining S2 a current brightness value vector the components $\alpha_i(t)$ of which correspond to current integrated brightness values of an $i^{th}$ interior image zone; determining S3 a target zone brightness regulation value from the scalar product of the current brightness value vector and a target zone calibration vector associated with an interior target zone; and regulating S4 the target zone brightness regulation value to a target zone brightness set value by adjusting the illumination intensity of the target zone lighting means. After step S4, the procedure starts again at step S1.

As explained above, by providing the method according to the invention, the regulation value for regulating the brightness of target zone lighting means can be determined very accurately. Furthermore, this makes it possible to regulate multiple lighting means independently of each other, with only one sensor being required for this. Thus, with a simple setup of the system, the regulation can be done individually and thus energy can be saved significantly.

The invention claimed is:

1. A method for regulating the brightness of target zone lighting means (14a, 14b) illuminating an interior target zone (16a, 16b) in an interior space (10), comprising the following steps:

optically mapping (S1) at least part of the interior space (10) onto an image (20) of the interior space by spatially resolved brightness sensor means (18), wherein the image (20) of the interior space includes at least two interior image zones (22a, 22b, 22c, 22d), determining (S2) a current N-dimensional brightness value vector the $i^{th}$ component of which each corresponds to current integrated brightness values of the $i^{th}$ interior image zone (22a, 22b, 22c, 22d), wherein t is the current time, wherein the dimension N is greater than or equal to 2 and the index i runs over at least one subset of the set of interior image zones (22a, 22b, 22c, 22d), determining (S3) a target zone brightness regulation value from the scalar product of the current brightness value vector and an N-dimensional target zone calibration vector associated with an interior target zone (16a, 16b), regulating (S4) the target zone brightness regulation value to a target zone brightness set value by adjusting the respective illumination intensity of the target zone lighting means (14a, 14b).

2. The method according to claim 1, wherein the brightness sensor means (18) include a photodiode array or a camera (18).

3. The method according to claim 1, wherein the interior space (10) includes a building's interior space (10) and the interior image zones (22a, 22b, 22c, 22d) correspond to different space areas (16c) of the building's interior space (10) the reflective properties of which remain substantially unchanged.

4. The method according to claim 1, wherein, if the dimension N of the brightness value vector and the target zone calibration vector equals the number of interior image zones, the components of the target zone calibration vector are determined by solving the linear system of equations $$\Sigma_i \alpha_{ji} \lambda_i = K_j$$

wherein index i corresponds to the $i^{th}$ interior image zone (22a, 22b, 22c, 22d), $\lambda_i$ corresponds to the $i^{th}$ component of the target zone calibration vector, $\alpha_{ij}$ corresponds to the integrated brightness value of the $i^{th}$ interior image zone (22a, 22b, 22c, 22d) at different times of the day or in different lighting situations j, and $K_j$ corresponds to the brightness values in the interior target zone (16a, 16b) measured by a luxmeter (30a, 30b) at the time of day or in the lighting situation j, wherein the indices i and j each pass the value range from 1 to N.

5. The method according to claim 4, wherein, when determining the target zone calibration vector, the brightness value $K_j$ measured by the luxmeter (30a, 30b) is a value integrated over the visible spectral range, wherein the brightness value of the $i^{th}$ interior image zone $\alpha_{ij}$ determined by the brightness sensor means (18) is a value integrated over both the visible spectral range and a non-visible spectral range.

6. The method according to claim 1, wherein an interior image zone (22d) corresponds to a window area (16d).

7. The method according to claim 6, wherein, if a component of the target zone calibration vector corresponding to the interior image zone (22d) corresponds to the window area (16d), such component of the target zone calibration vector is negative.

8. The method according to claim 1, wherein the method further comprises a presence detection step of detecting a presence of people in the interior image zones (22a, 22b, 22c, 22d), wherein interior image zones in which the presence of people has been detected are not used to determine the components of the current brightness value vector.

9. The method according to claim 1, wherein the interior image zones (22c) used for determining the components of the brightness value vector correspond to substantially invariable areas of the interior space (10).

10. A system (24) for regulating the brightness of target zone lighting means (14a, 14b) illuminating an interior target zone (16a, 16b) in an interior space (10), comprising:

spatially resolved brightness sensor means (18) which are configured to optically map at least part of the interior space (10) onto an image (20) of the interior space, wherein the image (20) of the interior space includes at least two interior image zones (22a, 22b, 22c, 22d), and to determine a current N-dimensional brightness value vector the $i^{th}$ component of which each corresponds to current integrated brightness values of the $i^{th}$ interior space zone (22a, 22b, 22c, 22d), wherein t is the current time, wherein the dimension N is greater than or equal to 2 and the index i runs over at least one subset of the set of interior image zones (22a, 22b, 22c, 22d), a computing unit (26) which is configured to determine a target zone brightness regulation value from the scalar product of the current brightness value vector and an N-dimensional target zone calibration vector associated with an interior target zone (16a, 16b), and a regulation unit (28) which is configured to regulate the target zone brightness regulation value to a target zone brightness set value by adjusting the respective illumination intensity of the target zone lighting means (14a, 14b).

11. The system (24) according to claim 10, further comprising presence detection means (32) which are configured to detect a presence of people in the interior image zones (22a, 22b, 22c, 22d).

12. The system (24) according to claim 10, wherein the regulation unit (28) includes an IP interface and/or a system bus interface.

13. The system (24) according to claim 10, further comprising a luxmeter (30a, 30b) which is configured to measure brightness values in an interior target zone (16a, 16b) to calibrate the device prior to commencement of the regulation operation.

14. The system (24) according to claim 10, wherein the regulation unit (28) is configured to perform a regulation operation at time intervals of less than two seconds by adjusting the illumination intensity of the target zone lighting means (14a, 14b).

15. The system (24) according to claim 14, wherein the time interval between two successive regulation operations is smaller when the illumination intensity is increased than when the illumination intensity is decreased.

16. The method according to claim 9, wherein the substantially invariable areas are wall and/or ceiling areas (16c) of the interior space (10).

* * * * *